(12) United States Patent
Oka et al.

(10) Patent No.: US 6,364,546 B1
(45) Date of Patent: Apr. 2, 2002

(54) PHOTOGRAPH PROCESSING APPARATUS

(75) Inventors: Teruhito Oka; Shinji Azuma; Takuya Shiotani, all of Wakayama (JP)

(73) Assignee: Noritsu Koki Co., Ltd., Wakayama-ken (JP)

( * ) Notice: Subject to any disclaimer, the term of this patent is extended or adjusted under 35 U.S.C. 154(b) by 0 days.

(21) Appl. No.: 09/632,744

(22) Filed: Aug. 4, 2000

(30) Foreign Application Priority Data

Aug. 5, 1999 (JP) ............................................. 11-222273
Oct. 5, 1999 (JP) ............................................. 11-284089
Oct. 8, 1999 (JP) ............................................. 11-287749

(51) Int. Cl.$^7$ ........................... G03D 17/00; G03D 3/08; G03B 27/52
(52) U.S. Cl. ........................... 396/599; 396/612; 355/27
(58) Field of Search ............................... 355/27–29, 40, 355/41, 75, 76, 77; 396/564, 599, 612

(56) References Cited

U.S. PATENT DOCUMENTS

| | | | |
|---|---|---|---|
| 3,807,264 A | 4/1974 | Jessop | ........................... 83/175 |
| 4,519,688 A | 5/1985 | Kitch et al. | .................. 396/564 |
| 5,374,972 A | * 12/1994 | Nakane et al. | .............. 396/612 |
| 5,416,553 A | 5/1995 | Sakaguchi et al. | ........... 396/620 |
| 5,497,217 A | 3/1996 | Yoshida | ........................ 355/77 |
| 5,993,083 A | * 11/1999 | Tsuzawa | ...................... 396/612 |
| 6,030,131 A | * 1/2000 | Shimamura et al. | ......... 396/599 |

FOREIGN PATENT DOCUMENTS

JP    11-265030    9/1999

* cited by examiner

*Primary Examiner*—D. Rutledge
(74) *Attorney, Agent, or Firm*—Knobbe, Martens, Olson & Bear, LLP

(57) ABSTRACT

A photograph processing apparatus includes: (i) an exposing portion for recording a picture onto a photosensitive material piece cut to a print size; (ii) a developing portion for developing the photosensitive material piece; (iii) a magazine for containing in roll a lengthy photosensitive material composed of pieces connected to each other via a splicing portion in the vicinity of which a detecting slot for detecting the splicing portion is formed; (iv) cutting means for cutting the photosensitive material as being drawn from the magazine, to a predetermined print size including the splicing portion and the detecting slot; (v) a conveying roller having a width smaller than, equal to, or larger than the width of the detecting slot; and (vi) width-direction shifting means for shifting the photosensitive material piece with the splicing portion to a position such that the conveying roller may not be countered with the detecting slot.

9 Claims, 13 Drawing Sheets

FIG.14

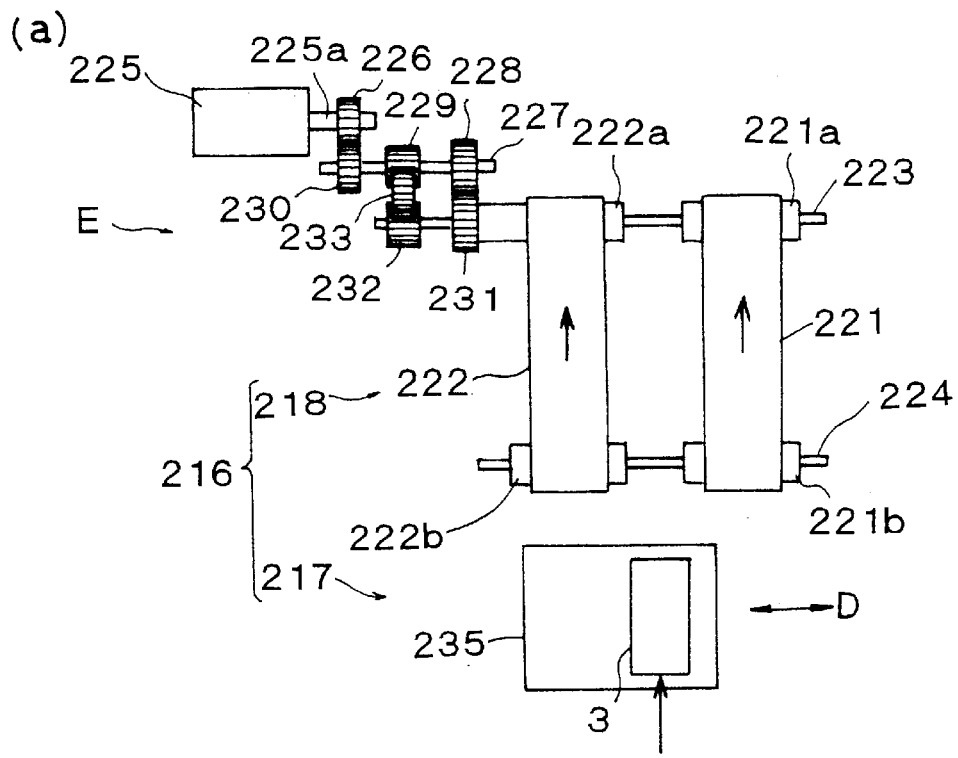

(b)

| | Second conveyor belt driving direction | First, second conveyor belts driving direction |
|---|---|---|
| Driving motor | CCW | CW |
| Transfer shaft | CW | CCW |
| First transferring gear | CW | OFF |
| Second transferring gear | OFF | CCW |
| Idling gear | OFF | CW |
| Driving gear | OFF | CCW |
| Second conveying gear | CCW | CCW |

CW (clockwise) and CCW (counterclockwise) refer to respective directions as viewed in an arrow E direction.

FIG. 17
(a) 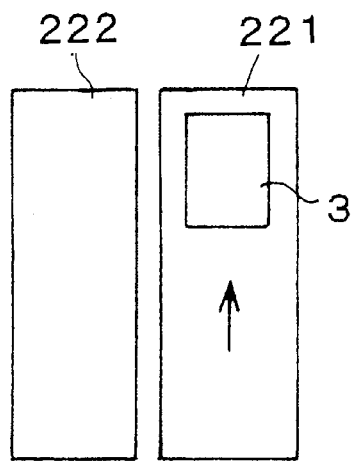
(b) 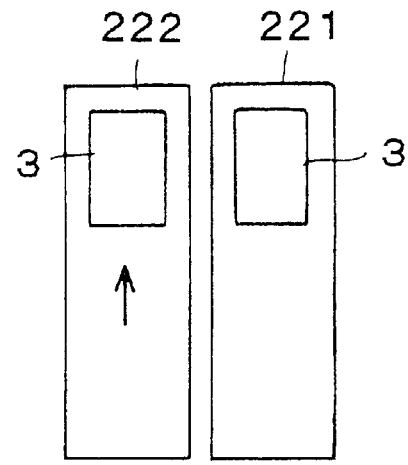
FIG. 18 (PRIOR ART)
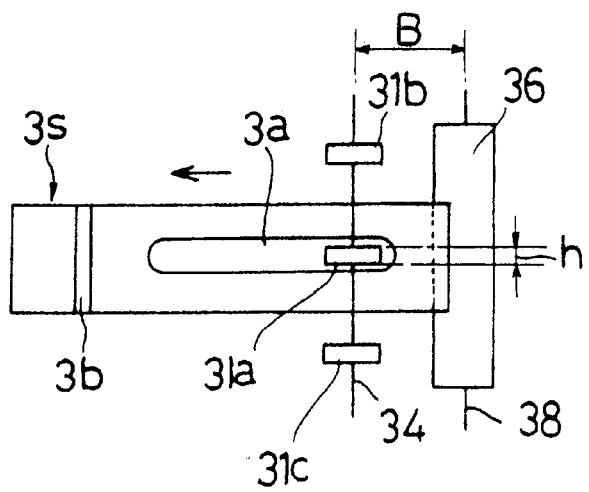

PHOTOGRAPH PROCESSING APPARATUS

BACKGROUND OF THE INVENTION

1. Field of the Invention

The present invention relates to a photograph processing apparatus and, more particularly, to a photograph processing apparatus capable of processing a lengthy photosensitive material spliced at splicing portions. In the apparatus, a photosensitive-material-containing magazine contains the photosensitive material which is rolled up. The photosensitive material has a detecting slot longitudinally formed near; each of the splicing portions for detecting these portions.

2. Description of the Related Art

Such a photograph processing apparatus records, under exposure, a frame picture of a negative or a digital picture film onto a photosensitive material or develops and dries thus-exposed photosensitive material, to eject it as cut in photograph print from the apparatus. To process this photosensitive material, the photograph processing apparatus is adapted to be mounted at its predetermined portion with a photosensitive-material containing magazine.

In the photosensitive-material containing magazine, a lengthy photosensitive material is wound in roll as long as 100 and a few tens of meters in some cases. In processing a photograph, the photosensitive material is pulled out of the photosensitive-material magazine and conveyed during predetermined processing. Ideally, the photosensitive material should preferably be contained with no splicing portions in the photosensitive-material containing magazine; actually however, splicing portions may be provided for a manufacturing reason etc.

The following will describe splicing portions with reference to FIG. 3. As shown in FIG. 3, a photosensitive material is cut with a cutter (cutting means) in front of and behind a splicing portion. Such a photosensitive material is hereinafter called splicing portion-attached photosensitive material 3s. The splicing portion-attached photosensitive material 3s comprises a splicing portion at which photosensitive material pieces are spliced in a longitudinal direction, and a detecting slot 3a for detecting the splicing portion 3b. At the splicing portion 3b, front and rear photosensitive material pieces are spliced by an appropriate method such as thermal fusion.

The detecting slot 3a is formed in the photosensitive material longitudinally (in a conveying direction), measuring x in the longitudinal direction and y in the conveying-width direction. The detecting slot size and position with respect to the splicing portion 3b are specified by the JIS Standards and the ISO Standards.

The following will briefly describe a configuration of a conveying means or a plurality of conveying means for conveying a photosensitive material 3 in a photograph processing apparatus, which conveying means is positioned near an ejecting port. FIG. 5 is a side view of the conveying means T in the vicinity of the ejecting portion 10, and FIG. 6 is a plan view of the conveying means T shown in FIG. 5.

The photosensitive material is conveyed in the arrow direction in the figure. The above-mentioned conveying means T comprises a driving roller 39, a pressing roller 40, a large-diameter roller 35 provided at a curved corner on a conveying path, a pair of pressing rollers 36 and 37 pressed against the large-diameter roller 35, a driving roller set 30, and a pressing roller set 31. As shown in FIG. 6, the pressing roller set 31 comprises three pressing rollers of 31a, 31b, and 31c arranged in a conveying-width direction and supported by a supporting shaft 34. The driving roller set 30 also comprises three driving rollers corresponding to the above-mentioned pressing rollers 31a–31c.

How the splicing portion-attached photosensitive material 3s is conveyed is explained as follows: it is conveyed over the large-diameter roller 35 and the driving roller set 30, more specifically by the pressing roller 31a at the center among the pressing roller set 31 and the driving roller, in which the pressing roller 31a has its width size h a little smaller than a width size y of the detecting slot 3a (see FIG. 18).

With this, therefore, when the splicing portion attached photosensitive material 3s is conveyed so that the detecting slot 3a may be positioned at the pressing roller 31a, this pressing roller 31a cannot transfer conveying force. To certainly convey the splicing portion-attached photosensitive material 3s even in such a case, a distance A has been large between the end of the detecting slot 3a and that of the photosensitive material 3s so that even if conveying force by the pressing roller 31a cannot be transferred, conveying force by the large-diameter roller 35 and the first pressing roller 36 on the upstream side can be transferred. That is, if, as shown in FIG. 5, a distance B as supposed to be a spacing between the large-diameter roller 35 and the pressing roller set 31 is set so that A<B, the splicing portion-attached photosensitive material 3s cannot be conveyed. Therefore, at least a relationship of A>B must be established.

The splicing portion-attached photosensitive material 3s cannot be used in printing and is to be discarded, so that the above-mentioned dimension A should have preferably been reduced as much as possible to minimize a resultant loss. Also, a suspected increase in the width of the pressing roller 31a is limited in view of a configuration shown in FIG. 6 in which large-diameter rollers 32a–32c are arranged next to the driving rollers 30a–30c to give a robustness to the photosensitive material.

Such a suspected method that takes out the splicing portion-attached photosensitive material 3s from the apparatus by stopping photograph processing is troublesome because it involves suspending of the photograph processing.

SUMMARY OF THE INVENTION

In view of the above, it is an object of the present invention to provide a photograph processing apparatus capable of minimizing a loss in a photosensitive material used while maintaining a high processing efficiency.

To this end, a photograph processing apparatus according to the present invention features such a configuration that comprises: an exposing portion for recording, under exposure, a picture on a photosensitive material which is cut to a print size; a developing portion for developing the photosensitive material; a photosensitive-material-containing magazine for containing in roll a lengthy photosensitive material composed of pieces connected via respective splicing portions in the vicinity of which, for each, a detecting slot is longitudinally formed for detecting each splicing portion; a cutting means for cutting the photosensitive material drawn from the photosensitive-material-containing magazine to a predetermined size as a splicing portion-attached photosensitive material having the splicing portion and the detecting slot; a conveying means for conveying the thus-cut photosensitive material; a conveying roller which is provided in the conveying means and which has a width the same as or narrower than the detecting slot; and a width-directional shifting means for shifting in a conveyance-width direction the splicing portion-attached photosensitive material to a position such that the conveying roller may not encounter the detecting slot.

With this configuration, a lengthy photosensitive material is drawn from the photosensitive-material-containing magazine mounted on a photograph processing apparatus and then undergoes exposure and other processes consecutively. The lengthy photosensitive material is cut by the cutting means to a predetermined print size, specifically in such a manner that the cutting means cuts a portion including the splicing portion and the detecting slot as a splicing portion-attached photosensitive material. This splicing portion-attached photosensitive material, which is conveyed by the conveying means having a narrow conveying roller, is actually conveyed by the width-directional shifting means in a conveying-width direction to such a position that the narrow conveying roller may not encounter the detecting slot. That is, the narrow conveying roller conveys the splicing portion-attached photosensitive material while evading the detecting slot, thus fully transferring conveying force by the narrow conveying roller to the photosensitive material.

With this, the distance A can be reduced between the end of the detecting slot 3a such as shown in FIG. 3 and that of the photosensitive material 3s, thereby decreasing a resultant loss.

A preferred embodiment of the present invention comprises a distributing/conveying mechanism for switching its conveying state from a single-sequence one to a multiple one, acting as the above-mentioned width-direction shifting means.

A distributing/conveying mechanism for switching the conveying mode of a photosensitive material from a single-line mode to a multiple-line mode may sometimes be provided in a photograph processing apparatus in order to improve its capacity for processing a photosensitive material. Such a distributing/conveying mechanism can act as the width-direction shifting means, to eliminate the need of a dedicated width-direction shifting means, thus reducing the cost and inhibiting increasing the size of an apparatus.

Another preferred embodiment of the present invention further comprises a stocking portion disposed between the above-mentioned exposing portion and the above-mentioned developing portion for stocking the above-mentioned photosensitive material, preferably comprising a switching device for switching the above-mentioned photosensitive material from the single-sequence state to the multiple-sequence state in conveyance, a tip aligning device for aligning the tips of the above-mentioned photosensitive material pieces switched by this switching device, and a plurality of stocking devices for stocking multiple sequences of these photosensitive material pieces with their tips mutually aligned, in such a manner that the above-mentioned switching device, tip aligning device, plurality of stocking devices are disposed in order from the upper-stream side of the above-mentioned conveying path.

The photograph processing apparatus according to the present invention has the following functions:

(1) cutting a photosensitive material to a predetermined print size before a picture is recorded on it under exposure;

(2) recording the picture on the photosensitive material under exposure;

(3) feeding thus exposed photosensitive material to the switching device provided on the stocking portion;

(4) switching, by use of the switching device, the photosensitive material from the single-line mode to the multiple-line (two lines or more) mode;

(5) feeding thus switched photosensitive material to the tip aligning device, to mutually align the tips of the photosensitive material pieces thus switched to the multiple-line mode; and (6) feeding these multiple lines of the photosensitive material pieces with their tips aligned with each other, to the stocking device.

Since the stocking device is provided two or more, photosensitive material pieces are stocked starting in the top one on the conveyance path. Then, they are stocked in sequentially from the top device. With the plurality of stocking devices provided, immediately after the photosensitive material can be fed to the developing portion, only the photosensitive material in the top stocking device can be fed to the developing portion, thus permitting a photosensitive material fed from the exposing portion to be sequentially stocked in the stocking devices on the up-stream side. Thus, the plurality of stocking devices provided enables accommodating a difference in processing speed between the developing portion and the exposing portion.

The stocking portion can stock therein a photosensitive material in a multiple-line mode. This configuration can drastically increase a stock quantity as compared to a single-line stocking configuration.

As a result, it has been made possible to provide a photograph processing apparatus that can reserve a sufficient quantity of photosensitive material while inhibiting larger sizing of the apparatus as a whole.

Still another preferred embodiment of the present invention has such a configuration that the stocking device disposed nearest, among the above-mentioned plurality of stocking devices, to the above-mentioned developing portion can be switched, in conveying of the above-mentioned photosensitive material, between a speed corresponding to a processing speed employed in the above-mentioned developing portion and a speed corresponding to a processing speed employed in the above-mentioned exposing portion.

With this configuration, a photosensitive material is stocked to the stocking device nearest to the developing portion by setting the processing speed (higher speed) employed in the exposing portion. Then, the photosensitive material is conveyed from this stocking device to the developing portion by setting the processing speed (lower speed) employed in the developing portion. With this, the photosensitive material can be rapidly stocked to the stocking portion.

Still another preferred embodiment of the present invention has such a configuration that the above-mentioned tip aligning mechanism forcedly feeds the above-mentioned photosensitive material to the above-mentioned stocking device immediately after a predetermined time lapse elapses.

Although the tip aligning device basically feeds multiple lines of photosensitive material pieces to the stocking device after they are aligned mutually, some troubles including disarrangement may disturb alignment of the multiple lines. In such a case, if the photosensitive material is held in the tip aligning device for long time, print color etc. may be adversely affected, and thus the photosensitive material is to be forcedly fed to the stocking device when a predetermined time passes. With this, undesirable coloring of the photosensitive material can be prevented.

Still another preferred embodiment of the present invention has such a configuration that the above-mentioned conveying path in the above-mentioned stocking portion snakes up and down.

This configuration of the conveying path snaking up and down makes it possible to reserve a sufficient stock quantity while inhibiting larger sizing of the photograph processing apparatus.

Moreover, the above-mentioned conveying means preferably comprises: a first conveying path for conveying the above-mentioned photosensitive material; a first conveying means provided along this first conveying path; a second conveying path for conveying the above-mentioned photosensitive material; a second conveying means provided along this second conveying path; one driving source for driving the above-mentioned first and second conveying means; a first driving-force transferring path for transferring driving force of the above-mentioned driving source to the above-mentioned first and second conveying means; and a second driving-force transferring path for transferring driving force of the above-mentioned driving source only to the above-mentioned second conveying means, in which when the above-mentioned driving source is switched in rotation, either the above-mentioned first or second driving-force transferring path is selected.

With this configuration, one driving source can drive both the first and second conveying means. Then, the driving source can be switched in rotation, so that for example in the case of a first rotation direction, driving force may be transferred along the first driving-force transferring path to both the first and second conveying means and, in the case of the second rotation direction, the driving force may be transferred along the second driving-force transferring path only to the second conveying means.

These first and second conveying means can be controlled as follows for aligning the tips of the photosensitive material pieces:

(1) First a photosensitive material is fed onto the first conveying path;

(2) In this case, driving force is driven in the first rotation direction, to drive both the first and second conveying means. Although the second conveying means also is thus driven, the photosensitive material is not fed onto it yet, so that it does not matter;

(3) When the photosensitive material comes up to a predetermined position, the driving source is stopped;

(4) Next, the driving source is switched to the second rotation direction;

(5) With this, only the second conveying means is driven, to convey the photosensitive material fed onto the second conveying path;

(6) When the tip of the photosensitive material piece fed onto the second conveying path is aligned with that waiting on the first conveying path, the driving source is switched to the first rotation direction again;

(7) The first and second conveying means are both driven downstream on the conveying path, to feed two sequences of the photosensitive material pieces as aligned at their tips.

Thus, only one driving source required makes it possible to provide a photosensitive-material conveying apparatus with a reduces cost and improved vibration, noise, and power dissipation.

Still another preferred embodiment of the present invention comprises: the above-mentioned first conveying means including a first conveyor belt and a first conveying roller around which the first conveyor belt is wound; the above-mentioned second conveying means including a second conveyor belt and a second conveying roller around which the second conveyor belt is wound; and a driving shaft for commonly supporting the above-mentioned first and second conveying rollers, in which the above-mentioned first conveying roller is supported so that it may be rotated along with the driving shaft, while the above-mentioned second conveying roller is supported via a third one-way clutch by the above-mentioned driving shaft.

This configuration can be simple because the driving shaft is adapted to support the first and second conveying rollers commonly. Also, since the first conveying roller is supported so as to be rotated along with the driving shaft and the second conveying roller is supported via the one-way clutch by the driving shaft, by rotating the driving shaft in such a direction as to lock the one-way clutch, both the firs tans second conveying rollers can be rotated. Also, by rotating only the second conveying roller, the above-mentioned one-way clutch can be slid to drive only the second conveyor belt.

Still another preferred embodiment of the present invention has such a configuration that comprises: a transfer shaft rotated by driving force of the above-mentioned driving source; a first transferring gear supported via a first one-way clutch to the above-mentioned transfer shaft; a second transferring gear supported to the above-mentioned transfer shaft via a second one-way clutch having actions in a direction opposite to that with the above-mentioned first one-way clutch; a third transferring gear which is adapted to rotate along with the above-mentioned second conveyor belt and mesh with the above-mentioned first transferring gear; a fourth transferring gear adapted to rotate along with the above-mentioned driving shaft; and an idling gear adapted to mesh with both the second and fourth transferring gears, in which driving force can be transferred through the above-mentioned transfer shaft, second transferring gear, idling gear, fourth transferring gear, and driving shaft in this order along the above-mentioned driving-force transferring path, to thus rotate the above-mentioned first and second conveying rollers and, along the second driving-force transferring path, driving force is transferred through the above-mentioned transfer shaft, first transferring gear, and third transferring gear in this order, to thus rotate only the above-mentioned second conveying roller.

With this configuration, when the driving source is driven in the first rotation direction, driving force can be transferred through the transfer shaft, second transferring gear, idling gear, fourth transferring gear, and driving shaft in this order, to drive both the first and second conveying rollers. Thus, both the first and second conveyor belts are driven. In this case, although the second one-way clutch remains locked, so that the transfer shaft and the second transferring gear rotate integrally, the first one-way clutch with actions in a direction opposite to that with the second one-way clutch is in a sliding state, so that the first transferring gear does not function in driving.

When the driving source is driven in the second rotation direction, on the other hand, driving force can be transferred through the transfer shaft, first transferring gear, and third transferring gear in this order, to thus drive only the second conveying roller (second conveyor belt). In this case, the first one-way clutch remains locked, so that the transfer shaft rotates along with the first transferring gear, while the second one-way clutch is in a sliding state, so that driving force is not transferred to the second transferring gear. Therefore, only the second conveying roller is driven. Note here that the third one-way clutch is also in a sliding state, so that the driving shaft is not driven even when the second conveying roller is rotated.

Thus, when only one driving source can be switched to certainly control the conveying of a photosensitive material.

BRIEF DESCRIPTION OF THE DRAWINGS

FIG. 14 is a plan view of the photosensitive-material conveying means of FIG. 13;

FIG. 17 shows how paper of FIG. 13 shifts; and

FIG. 18 is a plan view of how a conveying means of a prior art conveys a photosensitive material.

DETAILED DESCRIPTION OF THE PREFERRED EMBODIMENTS

Figure 1:
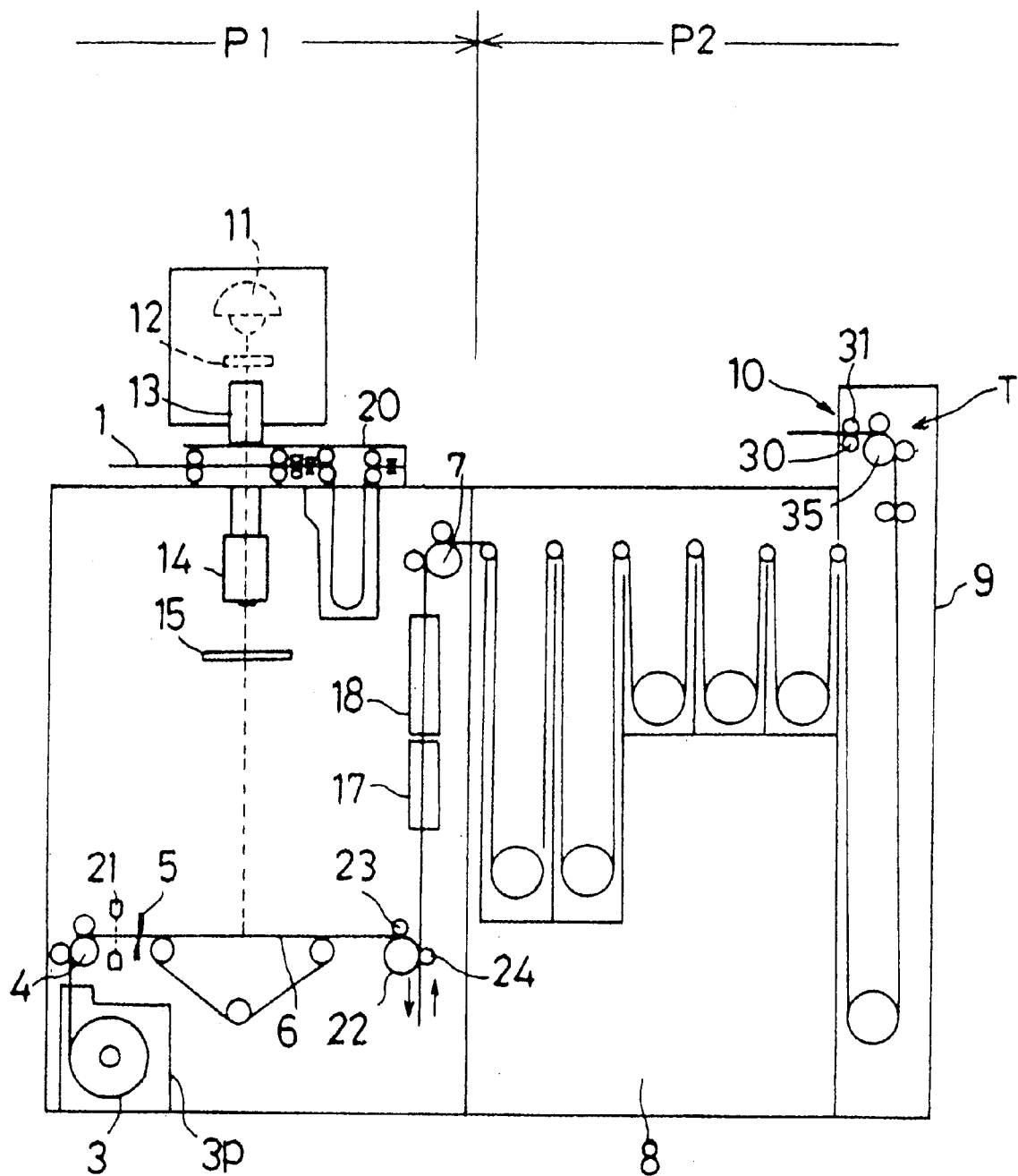
FIG. 1 shows an overall configuration of a photograph processing apparatus.

The following will describe in detail the embodiments of the present invention with reference to the drawings. FIG. 1 shows a schematic overall configuration of a photograph processing apparatus according to the present embodiment. This photograph processing apparatus roughly comprises a printing portion P1 for recording in projection a frame picture of a negative film 1 onto paper 3 (which corresponds to a photosensitive material) under exposure and a processor portion P2 for, for example, developing thus exposed paper 3.

Overall Configuration of Photograph Processing Apparatus

The printing portion P1 comprises, on a same optical path which provides an exposing optical path, a light source 11, a dimming filter 12 for adjusting a color balance of light applied to the negative film 1, a mirror tunnel 13 for evenly mixing the colors of the light passing through the dimming filter 12, a zooming-lens type printing lens 14 for imaging a frame picture of the negative film 1 onto the paper 3, a shutter 15, and a negative-film carrier 20 provided on a film conveying path.

The paper 3 is contained in roll in a paper magazine 3p (which corresponds to the photosensitive-material-containing magazine), and when the paper 3 is drawn from the paper magazine 3p, the paper 3 is conveyed by an advance roller 4 and then cut by a cutter 5 (which corresponds to the cutting means) to a print size. When thus cut paper 3 is fed to a predetermined position on an exposing station, a frame picture of the negative film 1 is recorded onto the paper 3 under exposure. Thus exposed paper 3 is fed over a roller 7 to the processor portion P2 and then, via a developing portion 8 and a drying portion 9, the paper 3 is ejected from an ejecting portion 10 as a finished print.

The following will detail the paper 3. Predetermined processing can be performed by pulling out the lengthy paper 3 from the paper magazine 3p in which is has been contained in roll. The paper magazine 3p is detachably mounted with a known attaching/detaching mechanism to the photograph apparatus at its predetermined position. If the paper magazine 3p runs out of the existing paper 3, a new roll of paper 3 is loaded into the paper magazine 3p. The paper 3 contained in the paper magazine 3p may sometimes measure in length 100 and a few tens of meters or more. Preferably, this lengthy paper 3 can be manufactured without a splicing portion (seam), actually however, it needs a splicing portion for a manufacturing reason etc.

Splicing Paper

Figure 3:
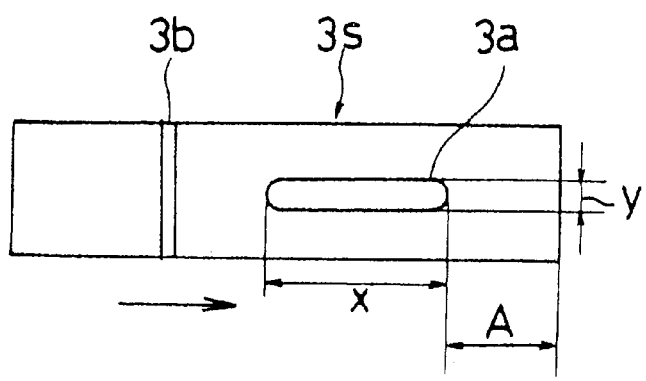
FIG. 3 is an external view of a splicing paper.

FIG. 3 shows paper 3 connected with a splicing portion 3b. The front and rear pieces of the paper 3 are spliced by use of thermal fusion, adhesion, or any other appropriate method. The splicing portion 3b is cut at the front and read ends by a cutter 5, to provide the paper 3, which is called splicing paper 3s (which corresponds to a photosensitive material with a splicing portion). The splicing paper 3s is provided with a splicing portion 3b and a detecting slot 3a for detecting the presence of the splicing portion 3b. The detecting slot 3a is formed in a longitudinal direction (conveying direction) of the paper 3, measuring x in the longitudinal direction and y in the conveying-width direction. The size of this detecting slot and its positional relationship with respect to the splicing portion 3b are specified by the JIS Standards and the ISO Standards.

Configuration of Components

The paper 3 pulled out from the paper magazine 3p is turned by the advance roller 4, and a sensor 21 detects whether a detecting slot 3a is present. When the detecting slot 3a is detected, it means that at a predetermined distance behind that detecting slot 3a, a splicing portion 3b is present. In response to the detection of the detecting slot 3a, the cutter 5 acts so as to provide a splicing paper 3s. In this case, a size A shown in FIG. 3 can be reduced as much as possible. If the splicing portion 3b is not detected, the cutter 5 acts to cut the paper 3 to a typical print size.

The paper 3 conveyed onto the exposing station 6 has a frame picture of the negative film 1 recorded thereon under exposure. Thus exposed paper 3 is fed to a switch-back mechanism equipped with a large-diameter roller 22, a first pressing roller 23, and a second pressing roller 24. This switch-back mechanism acts to turn the paper 3 upside down so that the emulsion surface of the paper 3 may be oriented in a direction preferable in the developing portion 8.

First, the exposed paper 3 is turned clockwise as viewed in FIG. 1 by use of the large-diameter roller 22 and the first pressing roller 23 in combination. Then, the paper 3 is fed out upward by the large-diameter roller 22 and the second pressing roller 24 in combination. The switch-back mechanism is provided with a guiding member for shifting the paper 3 as desired, which member is omitted in FIG. 1.

The paper 3 fed out from the switch-back mechanism is switched from the single-line conveying mode to a two-line conveying mode by a distributing/conveying mechanism 17. When the tips of the two-line paper 3 are aligned mutually, a tip aligning mechanism 18 feeds the paper 3 in two lines to the developing portion 8.

Distributing/Conveying Mechanism and Tip Aligning Mechanism

Figure 2:
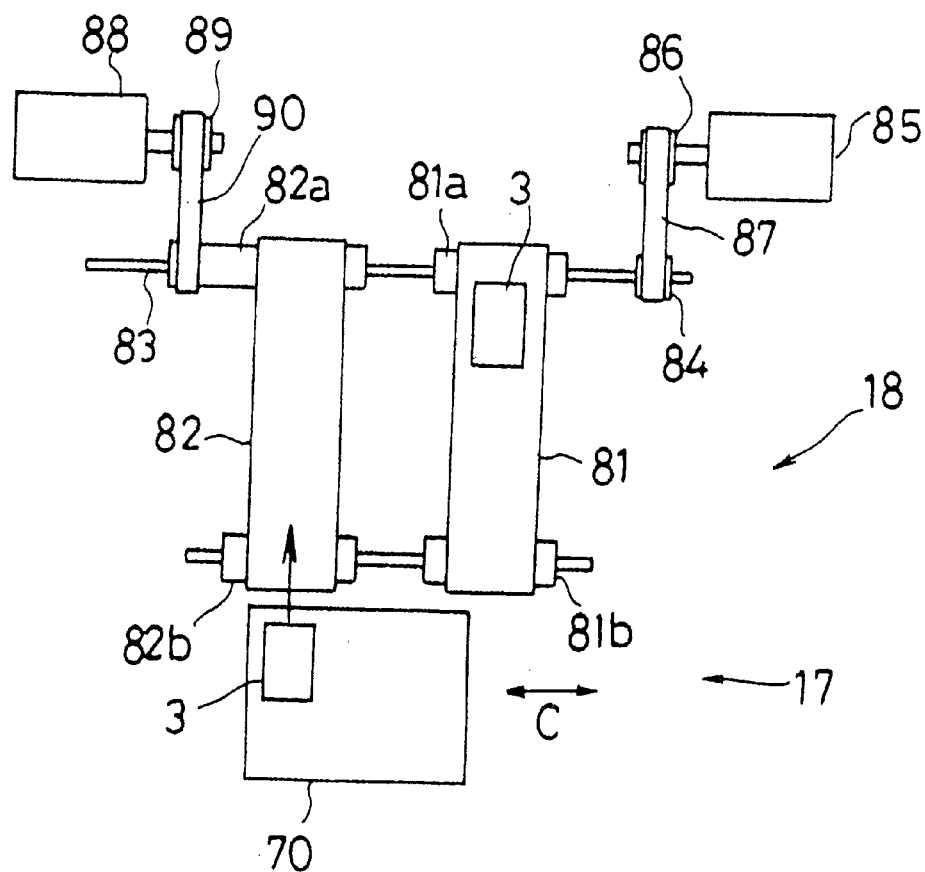
FIG. 2 shows a configuration of a distributing/conveying mechanism and a tip aligning mechanism of FIG. 1.

FIG. 2 shows the distributing/conveying mechanism 17 and the tip aligning mechanism 18. This tip aligning mechanism 17 has a first conveying path (right side of FIG. 2) for conveying the paper 3 and a second conveying path (left side of FIG. 2) as arranged in parallel with each other. Along the first conveying path are disposed a first conveyor belt 81 and first conveying rollers 81a and 81b which this first conveyor belt is wound around. Along the second conveying path are disposed a second conveyor belt 82 and second conveying rollers 82a and 82b which this second conveyor belt is wound around. The first and second conveying rollers 81a and 82a disposed on the downstream side along the conveying path are supported by their common driving shaft 83. The driving shaft 83 and the first conveying roller 81a are supported as fixed to be rotated integrally. The second conveying roller 82a is supported via its internal bearing by the driving shaft 83 in such a manner as to be rotated independently of the shaft 83.

Although not shown in FIG. 2, the paper 3 is actually conveyed as sandwiched by a pair of conveyor belts, only the mating belts 81 and 82 of which are shown in FIG. 2.

At one end of the driving shaft 83, a pulley 84 is provided, and a timing belt 87 is wound between the pulley 84 and a motor pulley 86 of a first driving motor 85. Also between a motor pulley 89 of a second driving motor 88 and the second conveying roller 82a, a timing belt 90 is wound. In such a configuration, when the paper 3 is fed from the upstream-side distributing/conveying mechanism 17 onto the first conveying path, only the first driving motor 85 is driven to drive the first conveyor belt 81 only, so that when the paper 3 has arrived at the top position of the first conveying path, the first driving motor 85 is stopped to put the paper 3 in a standby position. Next, when the paper 3 is fed from the distributing/conveying mechanism 17 onto the second conveying path, only the second driving motor 88 is driven to drive the second conveyor belt 82 only. When the tips of the paper 3 on first and second conveying paths are aligned with each other, the first and second driving motors 85 and 88 are both driven to feed the paper 3 as arranged in two lines to the downstream side.

The distributing/conveying mechanism 17 can shift a shifting unit 70 in a direction (arrow C direction in FIG. 2) perpendicular to the conveying direction, to distribute the pieces of the paper 3 in two lines. Although FIG. 2 shows a configuration of distributing paper pieces in two lines, the number of lines is not limited to two and may be three lines or more.

Figure 4:
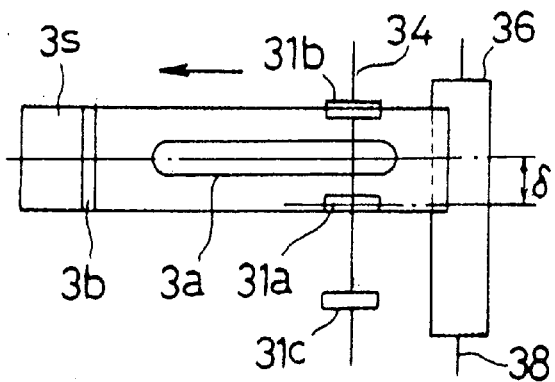
FIG. 4 is a plan view of the conveying means of FIG. 1.
Figure 5:
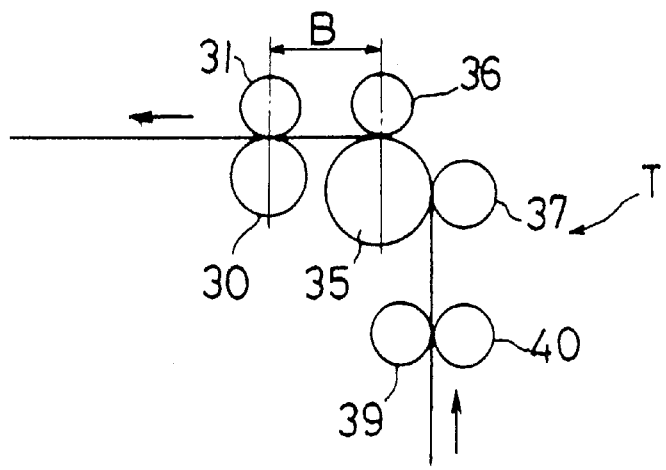
FIG. 5 is a side view of the conveying means of FIG. 1.
Figure 6:
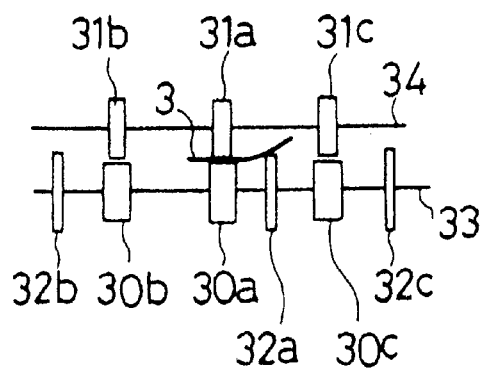
FIG. 6 is an elevation view of the conveying means of FIG. 1.

The following will briefly describe the configuration of a conveying means T, which is one of conveying means for the paper 3 and provided near an ejecting portion of the photograph processing apparatus. FIG. 5 is a side view of the conveying means T in the vicinity of the ejecting means 10. FIG. 4 is a plan view of the conveying means T shown in FIG. 5. FIG. 6 is an elevation view of the conveying means shown in FIG. 5.

This conveying means T comprises: a driving roller 39, a pressing roller 40, a large-diameter roller disposed at a curved corner on the conveying path, a pair of pressing rollers 36 and 37 pressed against this large-diameter roller 35, a driving roller set 30, and a pressing roller set 31. The pressing roller 36 has a supporting shaft 38. As shown in FIG. 6, the pressing roller set 31 consists of three pressing rollers 31a, 31b, and 31c disposed along the conveying path and is supported by a supporting shaft 34. The driving roller set 30 also consists of three driving rollers 30a, 30b, and 30c corresponding to the above-mentioned pressing rollers 31a–31c respectively (see FIG. 6). These driving rollers 30a–30c and the pressing rollers 31a–31c function as a conveying roller.

As shown in FIG. 6, adjacent to the driving rollers 30a, 30b, and 30c are respectively provided large-diameter rollers 32a, 32b, and 32c on the same supporting shaft 33. Since the paper 3 is contained as rolled in the paper magazine 3p, the paper 3 originally has a curled-ness and, besides, obtains another curled-ness in the same direction when it passes through the drying portion 9. If the paper 3 is ejected as having curled-ness from the ejection portion 10, it is ejected as its tip hung down, thus disturbing the subsequent classification work.

To guard against this, as shown in FIG. 6, the paper 3 is to be ejected as forcedly warped in the conveying-width direction (as having a robustness), to facilitate the subsequent classification of itself. Since a mechanism is employed which warps the paper 3, the pressing rollers 31a–31c cannot have a larger width. If that width is too large, the paper 3 is held too tight and so may be damaged due to the resultant large stress.

Conveying of Splicing Paper

The following describes how to feed the splicing paper 3s. When the splicing portion 3b of the paper 3 as pulled out from the paper magazine 3p is detected by the sensor 21, the cutter 5 cuts the paper 3 into a predetermined size of splicing paper 3s. This splicing paper 3s is not used in exposing processing so passes through the exposing station 6 as is. At this point in time, the splicing paper 3s has been conveyed in an arrow direction shown in FIG. 3, with the right side in FIG. 3 being the top in the conveying direction.

Next, when the splicing paper 3s passes through the switch-back mechanism, it is turned upside down and conveyed in such a state that the left side in FIG. 3 may be the top in the conveying direction. When this splicing paper 3s is fed to the distributing/conveying mechanism 17, it is shifted in the width direction as much as a predetermined distance. That is, the distributing/conveying mechanism 17 acts as a width-direction shifting means.

This width-direction shift is represented by δ as shown in FIG. 4. The splicing paper 3s passes through, as shifted in the width direction, the developing portion 8 and the drying portion 9 and is ejected by the conveying means T from the ejecting portion 10. The positional relationship between the splicing paper 3s and the pressing roller set 31 at this point in time is shown in FIG. 4. Since the splicing paper 3s is shifted in the width direction by as much as δ, the central pressing roller 31a is not encountered with the detecting slot 3a, so that the two pressing rollers 31a and 31b convey the splicing paper 3s while pressing side margins of the splicing paper 3s.

Thus, the splicing paper 3s can be ejected from the ejecting portion 10 without using driving force of the large-diameter roller 35 disposed on the upstream side of the driving roller set 30 and the pressing roller set 31. Therefore, the size A shown in FIG. 3 can be reduced, thus decreasing a loss in the quantity of paper used.

Another Embodiments of the Invention (1) The photograph processing apparatus according to the present invention may be configured as follows.

Figure 7:
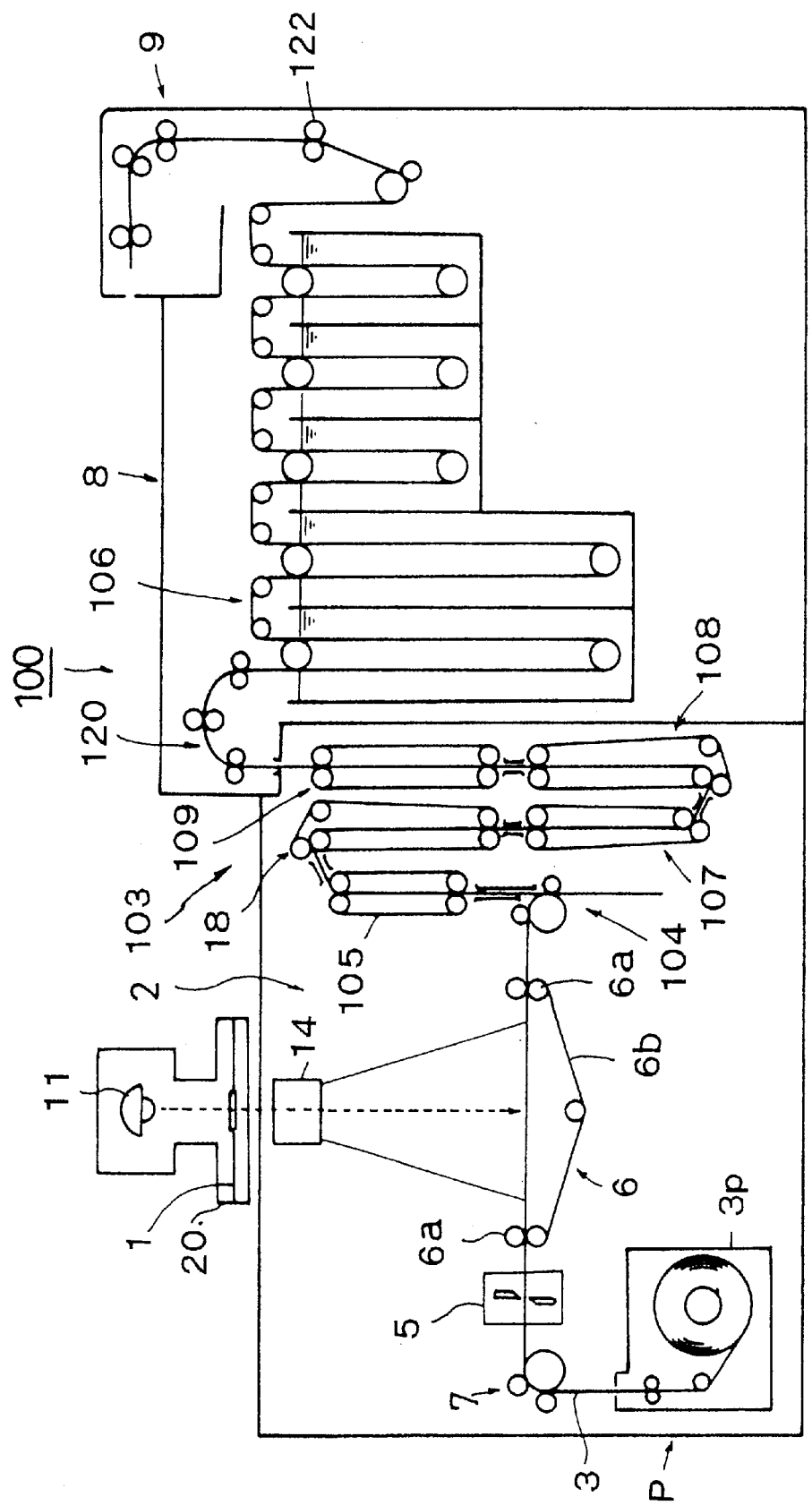
FIG. 7 is a schematic overall configuration diagram of a photograph processing apparatus according to another embodiment.

FIG. 7 shows a schematic overall configuration of this photograph processing apparatus 100. This photograph processing apparatus 100 comprises: a paper feeding portion P; an exposing portion 2 for recording a picture onto paper 3 under exposure; a stocking portion 103 for stocking the paper 3 cut to a print size; a developing portion 8 for developing the paper 3 as exposed; and a drying portion 9 for drying the paper 3 as developed.

Configuration of Components

The paper feeding portion P comprises: a paper magazine P for containing the paper 3 as rolled; a roller mechanism 7 for conveying the paper 3 as pulled out from the paper magazine 3p; and a cutter 5 for cutting the paper 3 to a print size.

The exposing station 2 comprises a light source 11 for exposure, a negative-film carrier 20 for setting thereon a negative film 1, and a printing lens 14 which are all disposed along the optical axis. An exposing station 6 is provided for recording a picture onto the paper 3 cut to a print size under exposure. This exposing station 6 is provided with a conveying roller 6a and a conveyor belt 6b, so that the paper 3 is vacuum-sucked to the conveyor belt 6b by a not shown mechanism and, as it is, has a picture recorded thereon under exposure and then is conveyed toward a stocking portion 103.

The stocking portion 103 comprises sequentially from the upper stream side along the conveying path: a switch-back device 104 for turning the paper 3 upside down; a distributing/conveying 105 for switching the paper 3 from a single-line mode to a two-line mode (which corresponds to the multiple-line mode); a tip aligning mechanism 18 for aligning the tips of the pieces of the thus-switched two sequences of the paper 3; a third stocking device 107 for stocking the paper 3 as arranged in the two-line mode; a second stocking device 108; and a first stocking device 109. The stocking portion 103 is explained in detail later.

The developing portion 8 comprises an introducing roller set 20 for receiving the paper 3 fed from the stocking portion 103 and a known developing tank 106. The developing tank 106 is comprised of a coloring developer bath, a bleaching bath, a fixing bath, etc., permitting the paper 3 to be developed while being conveyed over a plurality of conveying rollers.

In the drying portion 9, the paper 3 is dried while being conveyed over a plurality of rollers 122.

Configuration of Stocking Portion

Figure 8:
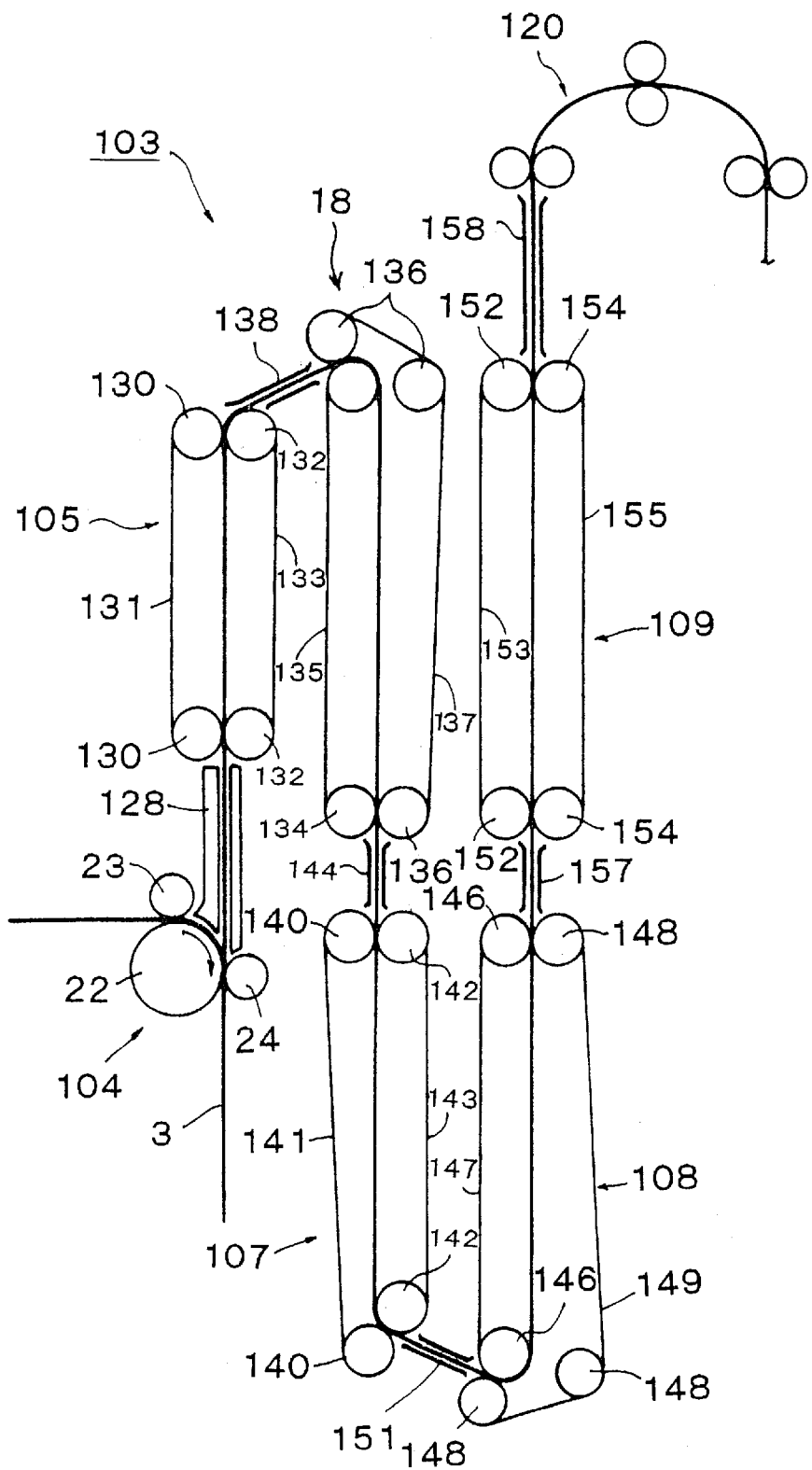
FIG. 8 is an expanded side view of a stocking portion used in the photograph processing apparatus of FIG. 7.
Figure 9:
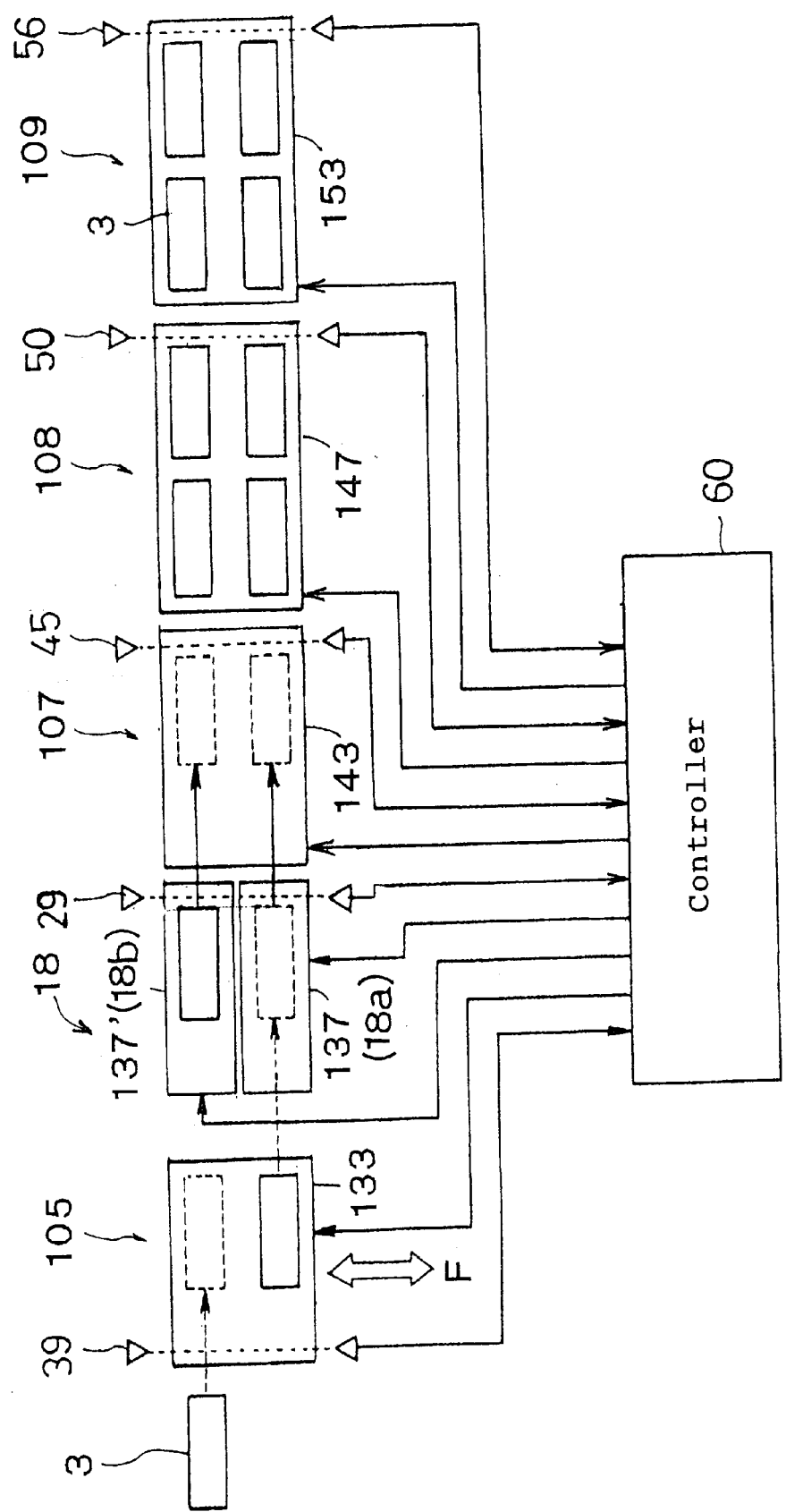
FIG. 9 is a plan view of the stocking portion used in the photograph of FIG. 7.

The following will describe the stocking portion 103 in detail with reference to FIGS. 8 and 9. FIG. 8 is a side view of the stocking portion 103, while FIG. 9 is its plan view.

The switch-back device 104 is provided for turning the paper 3 upside down. This is because the paper 3 should preferably be turned upside down as in the developing tank 106 so that its emulsion surface may face external from a viewpoint of coloring etc. The switch-back device 104 includes a large-diameter roller 22 and small-diameter rollers 23 and 24. Above the large-diameter roller 22, a guide 128 is provided for guiding the paper 3 to the distributing device 105.

The operations of the switch-back device 104 are explained as follows. The paper 3 as exposed is first fed clockwise (in an arrow direction in FIG. 8) around the large-diameter roller 22. Then, when the paper 3 has its rear end sandwiched between the large-diameter roller 22 and the small-diameter roller 24, the large-diameter roller 22 is rotated counterclockwise. With this, the paper 3 is conveyed toward the distributing device 105.

The distributing device 105 is comprised of a conveyor belt 131 wound around a pair of rollers 130 and a conveyor belt 133 wound around a pair of rollers 132, permitting the paper 3 to be conveyed as sandwiched between these conveyor belts 131 and 133. The distributing device 105 can be shifted in an arrow direction F in FIG. 9 by a not shown mechanism. At the entrance of the distributing device 105 is provided a sensor 39 for detecting that the paper 3 has come.

A tip aligning mechanism 18 comprises a conveyor belt 135 wound around a pair of rollers 134 and a conveyor belt 137 wound around three rollers 136. As can be seen from FIG. 9, the tip aligning mechanism 18 has two conveying-width-directional conveying mechanisms for independently conveying a plurality of lines of the paper 3. In FIG. 9, two conveyor belts 137 and 137' are shown. For convenience of explanation, they may be called a lower-side tip-aligning mechanism 18a and an upper-side tip-aligning mechanism 18b, respectively. At the exit of the tip aligning mechanism 18, a sensor 29 is provided for detecting whether the paper 3 has been fed normally. Further, a guide 138 is provided between the distributing device 105 and the tip aligning mechanism 18.

The stocking devices 107, 108, and 109 have basically the same configuration. The third stocking device 107 includes a conveyor belt 141 wound around a pair of rollers 40, a conveyor belt 143 wound around a pair of rollers 142, and a sensor 45 provided at the exit. A guide 144 is provided between the tip aligning mechanism 18 and the third stocking device 107.

The second stocking device 108 includes a conveyor belt 147 wound around 146, a conveyor belt 149 wound around three rollers 148, and a sensor 50 provided at the exit. A guide 151 is provided between the third stocking device 107 and the second stocking device 108.

The first stocking device 109 includes a conveyor belt 153 wound around a pair of rollers 152, a conveyor belt 155 wound around a pair of rollers 154, and a sensor 56 provided at the exit. A guide 157 is provided between the second stocking device 108 and the first stocking device 109. Also, a guide 158 is provided between the first stocking device 109 and the introducing roller set 120.

As shown in FIG. 9, a controller 60 is provided to control the driving of the devices 105, 18, 107, 108, and 109 based on signals sent from the sensors 39, 29, 45, 50, and 56.

As can be seen from FIG. 8, the vertically meandering conveying path for the paper 3 is formed in the stocking portion 103. With this, it is possible to prevent increasing the size of the stocking portion 103 and hence of the photograph printing apparatus 100 as a whole.

Explanation of Operations of Photograph Processing Apparatus

Figure 10:
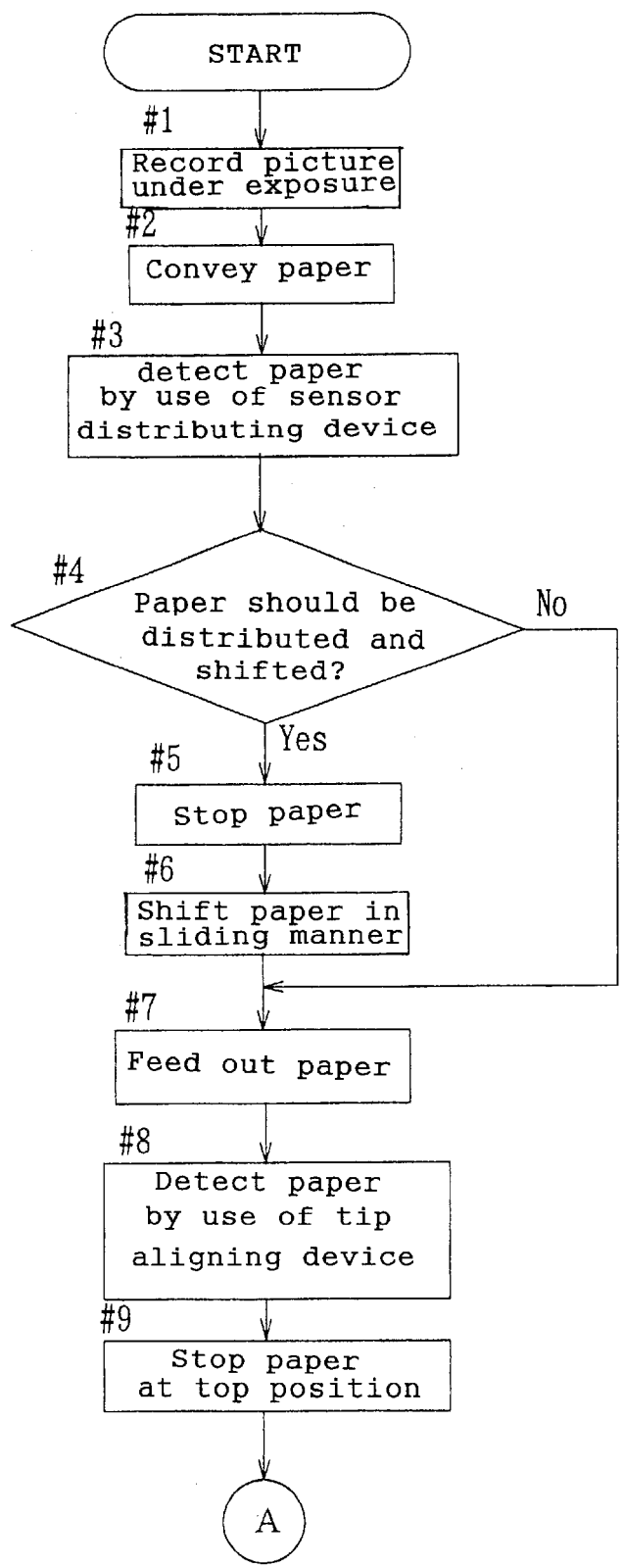
FIG. 10 is a flowchart (1) explaining a procedure for processing paper by the photograph processing apparatus of FIG. 7.
Figure 11:
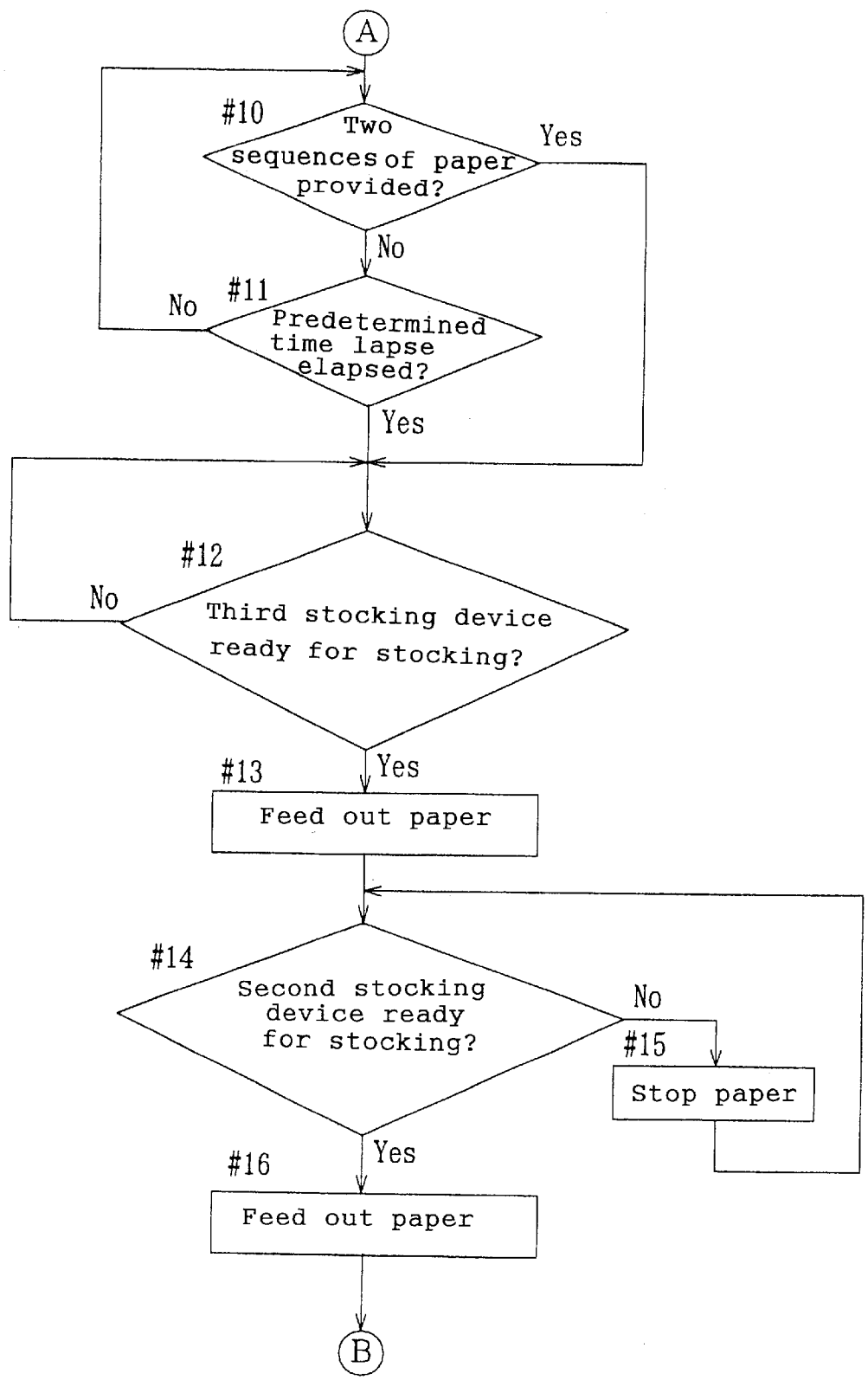
FIG. 11 is a flowchart (2) continuing from the flowchart of FIG. 10.
Figure 12:
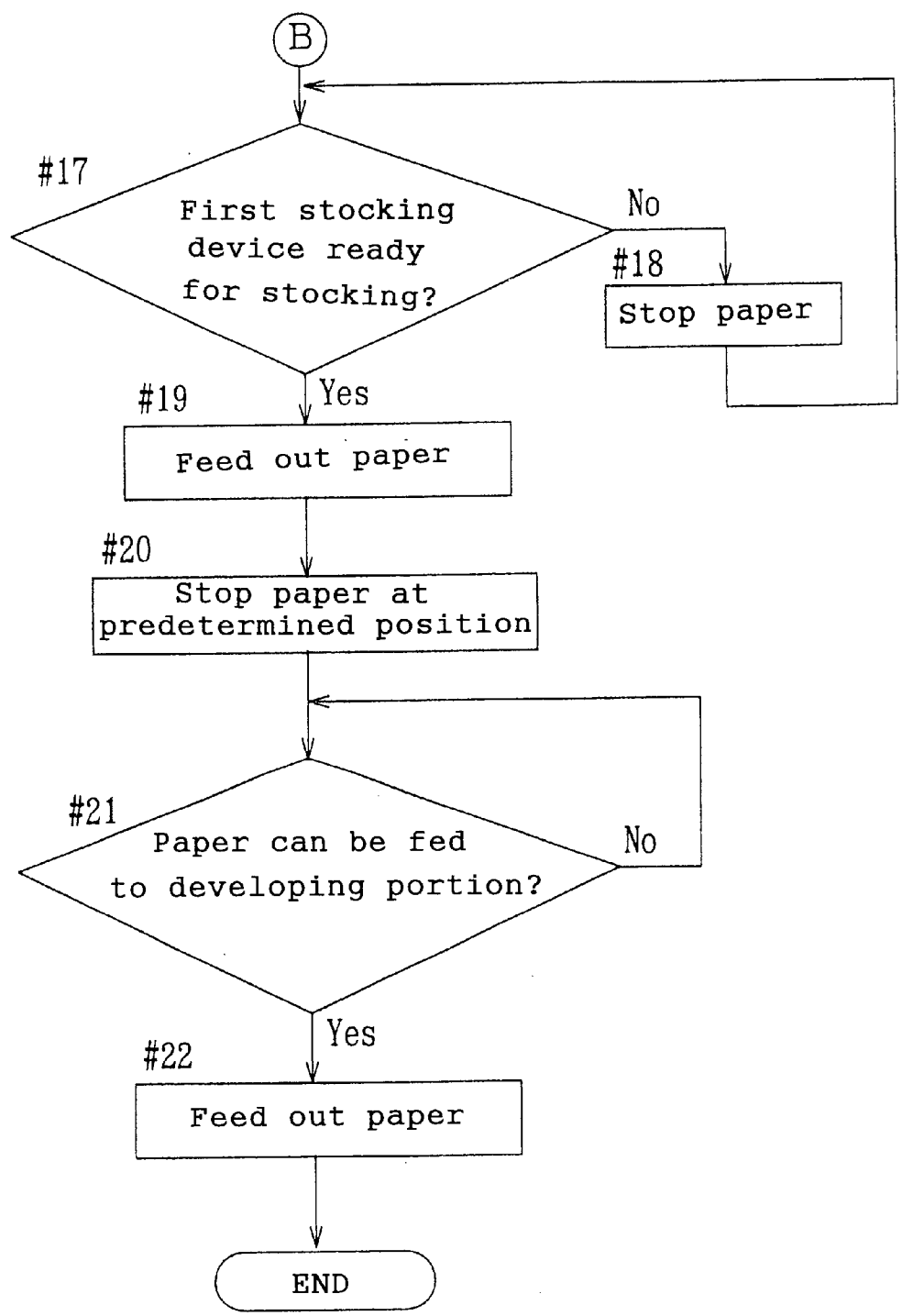
FIG. 12 is a flowchart (3) continuing from the flowchart of FIG. 11.

The following will describe the procedure for processing the paper 3 with reference to flowcharts shown in FIGS. 10, 11, and 12.

The paper 3 after being pulled out from the paper magazine 3p is cut to a print size by the cutter 5 immediately before the exposing portion 2. Next, it is fed to the middle in the exposing station 6 to have a picture of the negative film 1 recorded thereon under exposure (#1). The paper 3 with the picture recorded thereon under exposure is further fed (#2) to the switch-back 104, where it is turned upside down and then fed to the distributing device 105.

At the distributing device 105, the paper 3 is detected by the sensor 39 (#3). Next, it is decided whether it should be distributed and shifted (#4). That is, if it is decided that the paper 3 thus fed should be shifted to the lower-side tip-aligning mechanism 18a shown in FIG. 9, it is distributed and shifted (in an A direction). If the paper 3 should be shifted to the upper-side tip-aligning mechanism 18b shown in FIG. 9, it is not distributed or shifted but sent as is to the upper-side tip-aligning mechanism 18b (#7).

When distributed and shifted, the paper 3 is actually fed to the top position (which is indicated by a broken line) of the distributing device 105 and stopped there (#5). As for the timing of stopping the paper 3, by actually stopping the conveyor belts 131 and 133 when a predetermined time passes after the paper 3 is detected by the sensor 39, the paper 3 can be stopped at the above-mentioned top position. Or by supplying a predetermined number of driving pulses to a stepping motor for driving the conveyor belts 131 and 133 when the paper 3 is detected by the sensor 39, it can be stopped at the predetermined position. The paper 3 can be stopped also at other positions in a similar manner.

At step #5, the paper 3 is stopped and then the distributing device 105 slides in an arrow F direction (#6). With this, the paper 3 moves to a position where it faces against the lower-side tip-aligning mechanism 18a in FIG. 9. When sliding shift is completed, the paper 3 is fed toward the lower-side tip-aligning mechanism 18a (#7).

When the sensor 29 provided at the exit of the lower-side tip-aligning mechanism 18 detects that the paper 3 has come (#8), the paper 3 is stopped at the top position of the tip aligning mechanism 18 (#9).

The process next decides whether two lines of paper 3 have been aligned with each other (#10). That is, the process decides whether the tips of the paper 3 pieces are aligned with each other arranged in both of the two tip-aligning mechanisms 18a and 18b. This is conducted in order to convey the pieces of the paper 3 with their tips aligned with each other when they are conveyed in two lines. This makes it possible to make better use of a limited stock space. If the paper 3 is distributed every time it is sent from the exposing portion 2, is the paper will be conveyed in two zigzag lines, in which case, there will be given a considerable space between the paper pieces, thus reducing the stock quantity. Therefore, their tips should be aligned with each other so that the paper pieces can be conveyed with a narrow space therebetween, thus effectively utilizing the stock space.

When two lines of the paper 3 are fed, the process moves to step #12; otherwise, the process decides whether a predetermined time has passed after the paper 3 was fed (#11). This is conducted in order to forcedly feed the paper 3 when the predetermined time has passed even if two lines of the paper are not fed completely. If the paper 3 is left undeveloped after being exposed, its color is degraded.

When the paper 3 is ready for feed-out, the process decides whether the third stocking device 107 can stock it (#12) and, if possible, it feeds the paper 3 to the third stocking device 107 (#13). When the paper 3 has been fed to the third stocking device 107, the process further decides whether the second stocking device 108 can stock it (#14). If the process determines that the second stocking device 108 cannot stock the paper 3, the process stops the paper 3 at a predetermined position within the third stocking device 107 (#15). If the second stocking device 108 can stock the paper 3, the process feeds the paper to the second stocking device 108 (#16).

When the paper 3 has been fed to the second stocking device 108, the process further decides whether the first stocking device 109 can stock the paper 3 (#17). If it cannot, the process stops the paper 3 at a predetermined position within the second stocking device 108 (#18). If the first stocking device 109 can stock it, the process feeds out the paper 3 to the first stocking device 109 (#19). Then, the process stops the paper 3 at a predetermined position within the first stocking device 109 (#20).

Thus, the paper 3 after being exposed completely is to be stocked sequentially from the downstream side of the stocking portion 103. Next, the process decides whether the paper 3 can be fed to the developing portion 8 (#21) and, if possible, it feeds out the paper stocked in the first stocking device 109 (#22). To feed the paper 3 to the first stocking device 109, the conveying speed is set at a speed (higher speed) corresponding to the processing speed at the exposing portion 2 and to permit the first stocking device 109 to feed out the paper 3, on the other hand, the conveying speed is set at a speed (lower speed) corresponding to the processing speed at the developing device 8, with the conveying speed being able to be switched. The conveying speed at the second and third stocking devices 107 and 108 and the distributing device 105 and the tip aligning mechanism 18 other than the first stocking device 109 is set at a speed corresponding to the processing speed at the exposing portion 2.

Although this embodiment has distributed the paper 3 into two lines, the paper may be distributed into three or more lines.

Although this embodiment has used a belt as the mechanism at the stocking portion 103 for conveying the paper 3, a roller may be used instead.

Although in this embodiment, the stocking device has been given three, it may be given two or more.

Although in this embodiment, when the paper 3 is fed to the top of the distributing device 105, the paper 3 is stopped for the subsequent distribution, it may be handled as follows instead. That is, the paper 3 may be distributed while being conveyed with reference to a time point when its read end has left the rollers 22 and 24 of the switch-back device 104. With this, the processing efficiency can be improved.

Figure 13:
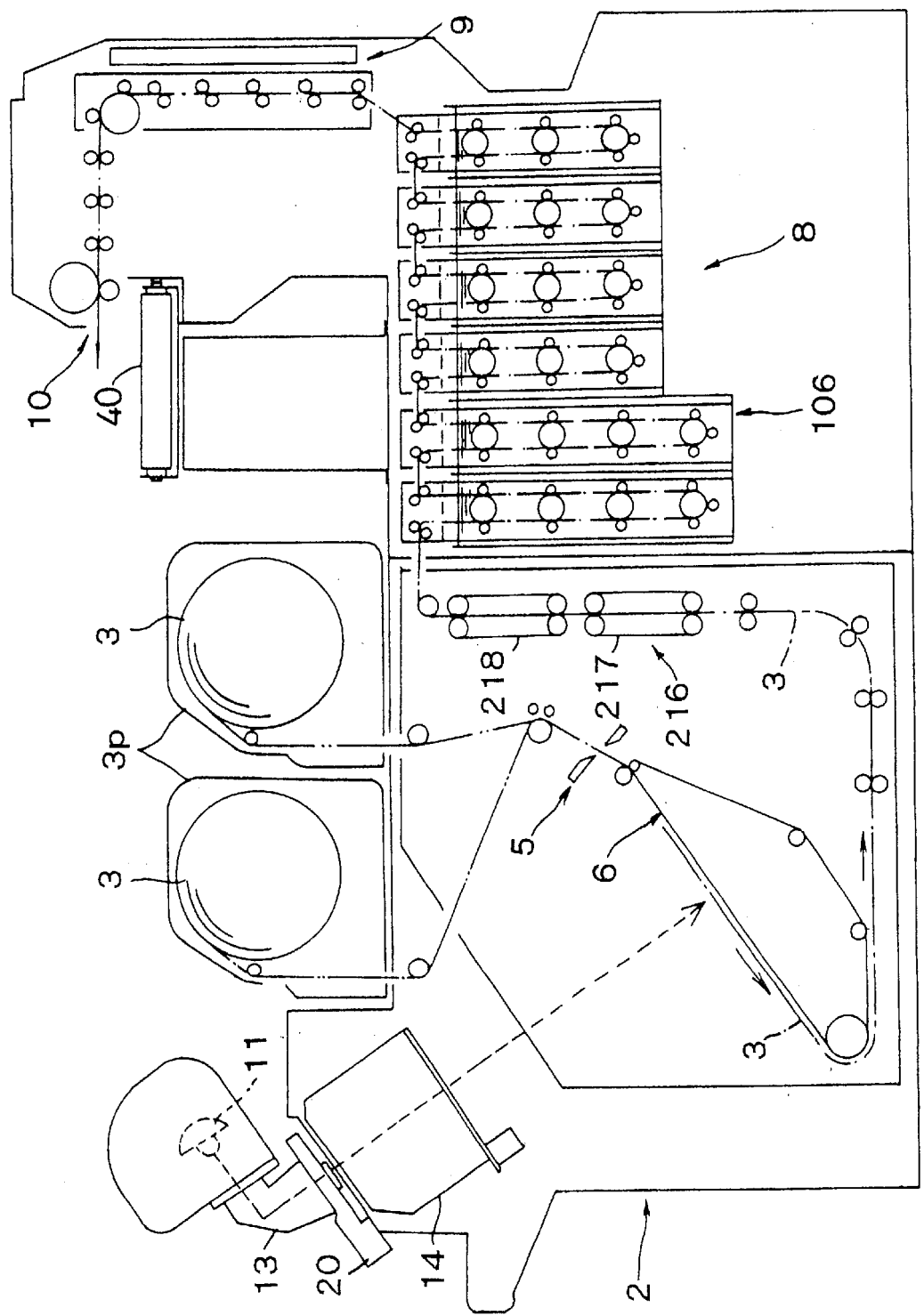
FIG. 13 is an overall configuration diagram of a photograph processing apparatus equipped with a photosensitive-material conveying means according to still another embodiment.

(2) Further, the configuration of a photograph processing apparatus using a photosensitive conveying means according to another embodiment is shown in FIG. 13.

Configuration of Photograph Processing Apparatus

This photograph processing apparatus, like that shown in FIG. 7, roughly comprises the exposing portion 2 and the developing portion 8. The exposing portion 2 has a publicly known configuration which mainly includes the paper magazine 3p which contains the paper 3 (which corresponds to a photosensitive material) as rolled, the cutter 5, a exposing station 6 with a conveyor belt, the light source 11, the mirror tunnel 13, the negative-film carrier 20, and the printing lens 14. The cutter 5 acts to cut the lengthy paper 3 pulled out from the paper magazine 3p to a print size, after which a picture of the negative film is recorded under exposure.

The paper 3 thus printed and exposed is conveyed in a single line in an arrow direction by the conveying device consisting of a set of rollers. A photosensitive-material conveying means 216 is provided to distribute the paper 3 before it is fed to the developing portion 8. This conveying means 216 is comprised of a distributing unit 217 and a feeding unit 218. The conveying means 216 is provided to distribute a single line of the paper 3 into two lines in conveyance. The distributing unit 217 is comprised of conveyor belts, moving in a direction perpendicular to the conveying path (i.e., in FIG. 13, a vertical direction with respect to the surface of FIG. 13). The feeding unit 218 is also comprised of conveyor belts. The paper 3, after being distributed into two lines by the photosensitive-material conveying means 216, is fed to the developing portion 8.

The developing portion 8 is provided with a developing tank 106 which consists of a plurality of processing tanks for storing a developer solution. The paper 3, after passing through the developing portion 8, is fed to the drying portion 9, where it is appropriately dried as it passes through the conveying path of the drying portion 9. The paper 3 is ejected from the print ejecting portion 10 and then collected in a tray (not shown) of an order classifier by a lateral-feeding conveyor 40.

Photosensitive-Material Conveying Means

Figure 15:
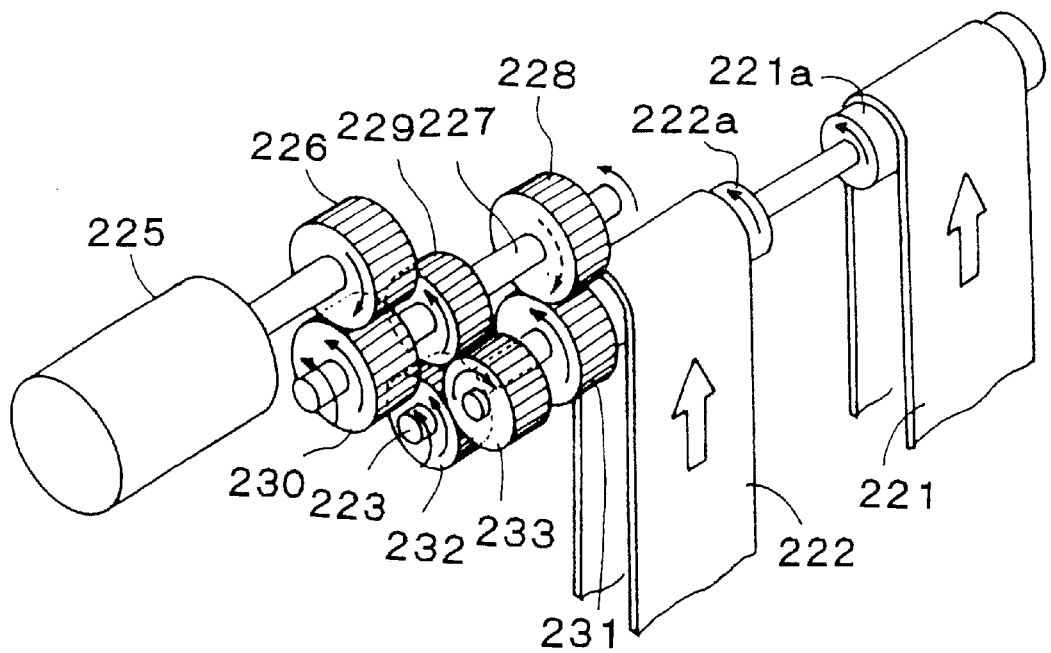
FIG. 15 is a perspective view (1) explaining operations of the photosensitive-material conveying means of FIG. 13.
Figure 16:
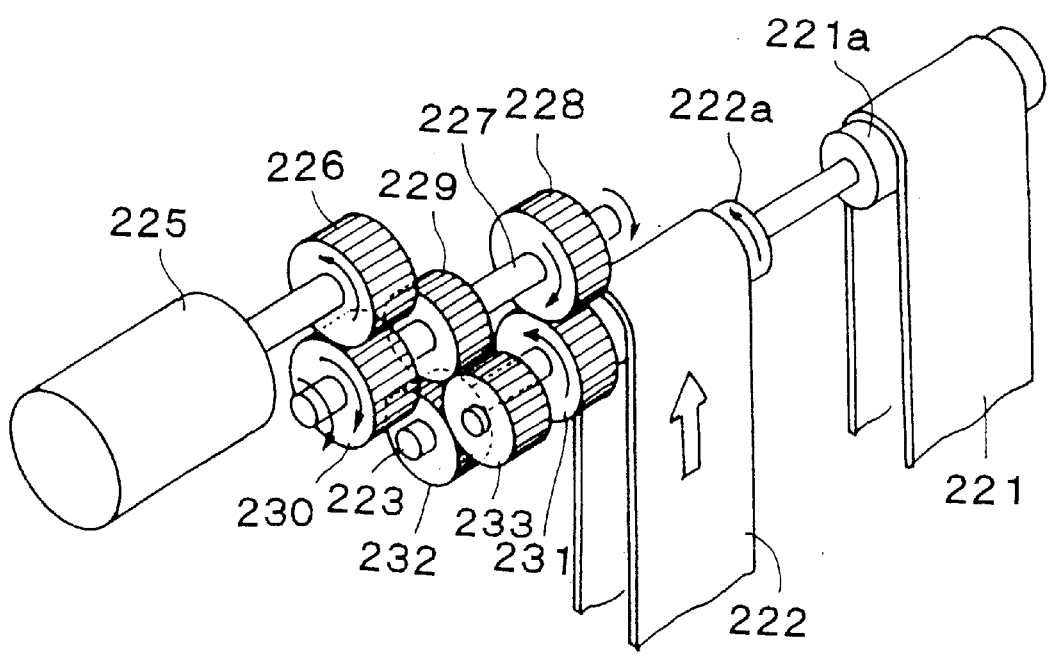
FIG. 16 is a perspective view (2) explaining the operations of the photosensitive-material conveying means of FIG. 13.

The following will describe the photosensitive-material conveying means 216. FIG. 14 is a plan view of the photosensitive-material conveying means, while FIGS. 15 and 16 are perspective views for explaining its operations.

In FIG. 14(*a*), a first conveying path on the right side is disposed in parallel with a second conveying path on the left side, The first conveying path comprises a first conveyor belt 221 for conveying the paper 3 and first conveying rollers 221*a* and 221*b* which this first conveyor belt 221 is wound around. The second conveying path likewise comprises a second conveyor belt 222 for conveying the paper 3 and second conveying rollers 222*a* and 222*b* which this second conveyor belt 222 is wound around. The paper 3 is actually conveyed as sandwiched between a pair of conveyor belts but, for convenience in illustration, only the mating conveyor belts are shown in FIG. 14(*a*).

The first and second conveying rollers 221*a* and 222*a* are supported by a common driving shaft 223. The first conveying roller 221*a* and the driving shaft 223 are fixedly supported so as to be always rotated integrally. The second conveying roller 222*a* and the driving shaft 223 are supported via the third one-way clutch (not shown), so that when that third one-way clutch is locked, the second conveying roller and the driving shaft 223 can be rotated integrally. Likewise, the first and second conveying rollers 221*b* and 222*b* disposed on the upstream side along the conveying path are also supported by a common supporting shaft 224.

One driving motor 225 is provided as the driving source. A motor shaft 225*a* of the driving motor 225 is mounted with a motor gear 226. To a transfer shaft 227 are supported a first transferring gear 228, a second transferring gear 229, and a fifth transferring gear 230. The fifth transferring gear 230 is fixedly mounted to the transfer shaft 227 so as to mesh with the motor gear 226. That is, the fifth transferring gear 230 and the transfer shaft 227 are configured so as to be always rotated integrally. The first transferring gear 228 is supported via the first one-way clutch (not shown) to the transfer shaft 227. The second transferring gear 229 is supported via the second one-way clutch (not shown) to the transfer shaft 227. The first and second one-way clutches are configured so as to act on each other oppositely in direction.

To the above-mentioned second conveying roller 222*a* is integrally formed a third transferring gear 231, which is disposed so as to mesh with the first transferring gear 228. To one end of the driving shaft 223 is fixedly mounted a fourth transferring gear 232, which is disposed so as to be always rotated with the driving shaft 223 integrally. Also, an idling gear 233 is provided which meshes with both the second transferring gear 229 and the fourth transferring gear 232.

The following will briefly describes the distributing unit 217. This distributing unit 217 is provided with a conveyor belt 235 which can move in an arrow D direction in FIG. 14, so that it may act to feed the paper 3 sent from the exposing portion 2 to either one of the conveying paths of the feeding unit 218.

Explanation of Operations of Photosensitive-Material Conveying Means

The following will describe the operations of the photosensitive-material conveying means with reference to FIGS. 14(*b*), 15, and 16. If, in FIG. 15, the driving motor 225 is rotated clockwise (CW: in the first rotation direction), the motor gear 226 is also rotated clockwise, thus rotating the fifth transferring gear 230 and the transfer shaft 227 counterclockwise (CCW). With the transfer shaft 227 thus rotating counterclockwise, the second one-way clutch is locked, thus rotating the second transferring gear 229 counterclockwise, the idling gear 233 clockwise, and the fourth transferring gear 232 counterclockwise. Note here that the clockwise and counterclockwise directions here refer to those as viewed in an arrow E in FIG. 14(*a*).

When the fourth transferring gear 232 is rotated counterclockwise, the driving gear 223 is also rotated counterclockwise, thus permitting the first conveying roller 221*a* fixed thereto to be also rotated counterclockwise. With the driving shaft 223 thus rotating counterclockwise, the third one-way clutch is locked, to rotate the second conveying roller 222*a* counterclockwise. With the second conveying roller 222*a* thus rotating counterclockwise, the third transfer gear 231 is also rotated counterclockwise, to thus rotate the first transfer gear 228 clockwise, which triggers the first one-way clutch to slide.

Thus, along the first driving-force transferring path, driving force is transferred through the driving motor 225, the motor gear 226, the fifth transferring gear 230, the transfer shaft 227, the second transfer gear 229, the idling gear 233, the fourth transfer gear 232, and the driving shaft 223 in this order, thus driving both the first and second conveyor belts 221 and 222.

The following will describe the operations with reference to FIG. 16 where the driving motor 225 is rotated counterclockwise. This rotates the motor gear 226 counterclockwise, the fifth transfer gear 230 clockwise, and the transfer shaft 227 clockwise. With the transfer shaft 227 thus rotating clockwise, the first one-way clutch is clocked, thus rotating the first transfer gear 228 clockwise integrally, and the third transfer gear 231 and the second conveying roller 222*a* and counterclockwise. Since, in this case, the third one-way clutch has an action in its sliding direction, the driving shaft 223 is not rotated, so that the first conveying roller 221*a* is not driven. The second one-way clutch has also an action in its sliding direction, thus not driving the second transfer gear 229.

Thus along the second driving-force transferring path, driving force is transferred through the driving motor 225, the motor gear 226, the fifth transferring gear 230, the transfer shaft 227, the first transferring gear 228, and the third transferring gear 231 in this order, thus driving only the second conveyor belt 222.

Moving of Paper

The following will briefly describe with reference to FIG. 17 the moving of the paper 3 as it is fed from the distributing unit 217 to the feeding unit 218. First, as shown in FIG. 17(a), the first paper 3 is fed by the distribution unit 217 to the first conveying path. In this case, the driving motor 225 is rotated clockwise. With this, as described with reference to FIG. 15, both the first and second conveyor belts 221 and 222 are driven, so that the paper 3 is conveyed by the first conveyor belt 221. In this case, the second conveyor belt 222 is also driven but the next paper 3 is not fed yet, so that it does not matter. When the paper 3 has reached the top position of the first conveying path, the driving motor 225 is stopped. With this, the paper 3 stops at a predetermined position.

Next, the next paper 3 is fed from the distributing unit 217 to the second conveying path, and thus the driving motor 225 is caused to rotate counterclockwise. With this, as described with reference to FIG. 16, only the second conveyor belt 222 is driven. When the tip of the paper 3 on the second conveying path and that of the paper 3 waiting on the first conveying path are aligned with each other, the driving motor 225 is rotated clockwise again. With this, both the first and second conveyor belts 221 and 222 are driven, thus feeding these two lines of the paper 3 with their tips aligned with each other to the developing portion 8 in the next step.

Although this embodiment has used conveyor belts as the conveying means, a set consisting of a plurality of conveying rollers may be used instead.

Although in the photosensitive-material conveying means 216 of this embodiment, the developing portion 8 has been provided just below the feeding unit 218, a mechanism for stocking the paper 3 may be provided on the downstream side of the feeding unit 218.

Although this embodiment has been described with reference to the distributing/conveying mechanism that distributes one line of paper to two lines, the present invention can be applied also to a case of distributing the paper to three or more lines. When a three-line distribution system is employed, for example, the aforesaid conveying portion for two lines can be replaced with a configuration for three lines. Also, when a four-line distribution system is employed, the aforesaid conveying portion for two lines can be replaced with a configuration for four lines, while using the remaining configuration. Similarly, the present invention can be applied to five or more lines of a distribution system.

(3) Although this embodiment has been described with reference to such a photograph processing apparatus as projecting a negative-film frame picture under exposure, the present invention is not limited to it but can be applied also to such a photograph processing apparatus as recording a digital picture onto a photosensitive material under exposure.

(4) Although as for the photograph processing apparatus mounted with a paper magazine, this embodiment has been described with reference to the paper magazine 3p containing the paper 3 having a splicing portion, the processing is of course possible also by mounting such a paper magazine 3p that contains therein the paper 3 without a splicing portion.

(5) Although in this embodiment, the cutter 5 as the cutting means has been disposed on the upstream side of the exposing station 6, it may be disposed at other appropriate positions.

What is claimed is:

1. A photograph processing apparatus comprising:
   an exposing portion for recording a picture onto a photosensitive material of a print size under exposure;
   a developing portion for developing the photosensitive material;
   a photosensitive-material containing magazine for containing a lengthy photosensitive material sheet which is rolled up and composed of multiple pieces, wherein a splicing portion connects the adjacent pieces and a detecting slot for detecting the splicing portion is formed near the splicing portion in a longitudinal direction of the photosensitive material piece;
   a cutting device for cutting the photosensitive material piece in pieces of a predetermined print size and pieces each containing the splicing portion and the detecting slot, while being drawn from the photosensitive-material-containing magazine;
   a conveying device for conveying thus cut photosensitive material pieces, said conveying device comprising a conveying roller which has a width smaller than, equal to, or larger than a width of the detecting slot; and
   a width-direction shifting device for shifting the photosensitive material piece containing the splicing portion and the detecting slot to a position such that the conveying roller does not encounter the detecting slot.

2. The photograph processing apparatus according to claim 1, further comprising a distributing/conveying mechanism for switching from a one-line mode of conveying the photosensitive material pieces to a multiple-line mode of conveying the photosensitive material pieces, wherein said distributing/conveying mechanism functions as the width direction shifting device.

3. The photograph processing apparatus according to claim 1, further comprising a stocking portion arranged between the exposing portion and the developing portion for stocking the photosensitive material pieces, which stocking portion comprises a distributing device for distributing the photosensitive material pieces conveyed in a line into multiple lines, a tip aligning device for aligning tips of the thus-distributed photosensitive material pieces, and a plurality of stocking devices for stocking the multiple lines of the tip-aligned photosensitive material pieces, wherein the distributing device, the tip aligning device, and the plurality of stocking devices are arranged in this order in the conveying direction.

4. The photograph processing apparatus according to claim 3, wherein a stocking device of the plurality of stocking devices which is the nearest to the developing portion is configured to switch the speed at which the photosensitive material pieces are conveyed between a speed corresponding to a processing speed in the developing portion and a speed corresponding to a processing speed in the exposing portion.

5. The photograph processing apparatus according to claim 3, wherein the tip aligning device is configured to forcedly feed out the photosensitive material pieces to the stocking device when a predetermined time passes.

6. The photograph processing apparatus according to claim 3, wherein the stocking portion has a vertically meandering conveying path.

7. The photograph processing apparatus according to claim 1, wherein the conveying device comprises:
   a first conveying path on which a first stream of the photosensitive material pieces is conveyed;
   first conveying means provided along the first conveying path;

a second conveying path on which a second stream of the photosensitive material pieces is conveyed;

second conveying means provided along the second conveying path;

a single driving motor for driving the first conveying means and the second conveying means;

a first driving-force transferring path for transferring driving force of a driving source to the first and second conveying means;

a second driving-force transferring path for transferring driving force of the driving source only to the second conveying means; and a switch for switching the first driving-force transferring path and the second driving-force transferring path by switching the rotational direction of the driving motor.

8. The photograph processing apparatus according to claim 7, wherein said first conveying means comprises a first conveyor belt and a first conveying roller around which the first conveyor belt is wound, both of which are provided in the first conveying means, and said second conveying means comprises a second conveyor belt and a second conveying roller around which the second conveyor belt is wound, both of which are provided to the second conveying means;

said apparatus further comprising a driving shaft for commonly supporting the first and second conveying rollers, and a switching mechanism, wherein the first conveyor roller is supported so as to rotate integrally with the driving shaft, while the second conveying roller is supported via a one-way clutch to the driving shaft.

9. The photograph processing apparatus according to claim 8, wherein said switching mechanism comprises:

a transfer shaft rotated by driving force of the driving source;

a first transferring gear supported via a first one-way clutch to the transfer shaft;

a second transferring gear supported to the transfer shaft via a second one-way clutch being operated in a direction opposite to the first one-way clutch;

a third transferring gear which is provided so as to rotate integrally with the second conveying roller and which meshes with the first transferring gear;

a fourth transferring gear provided so as to rotate integrally with the driving shaft; and an idling gear meshing with both the second transferring gear and the fourth transferring gear, wherein:

along the first driving-force transferring path, driving force is transferred through the transfer shaft, the second transferring gear, the idling gear, the fourth transferring gear, and the driving shaft in this order, to rotate the first conveying roller and the second conveying roller; and along the second driving-force transferring path, driving force is transferred through the transfer shaft, the first transferring gear, and the third transferring gear in this order, to rotate only the second conveying roller.

\* \* \* \* \*